UNITED STATES PATENT OFFICE.

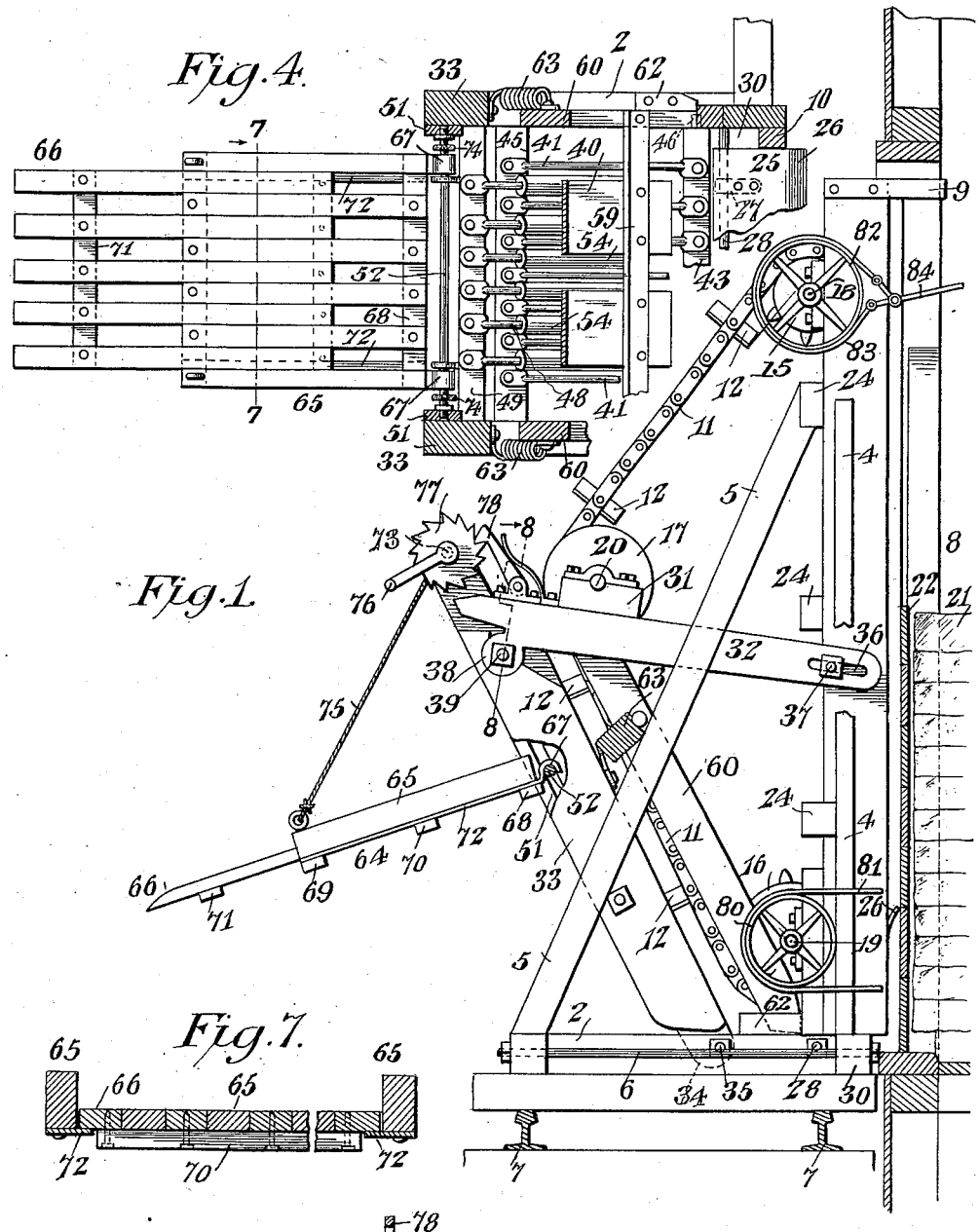

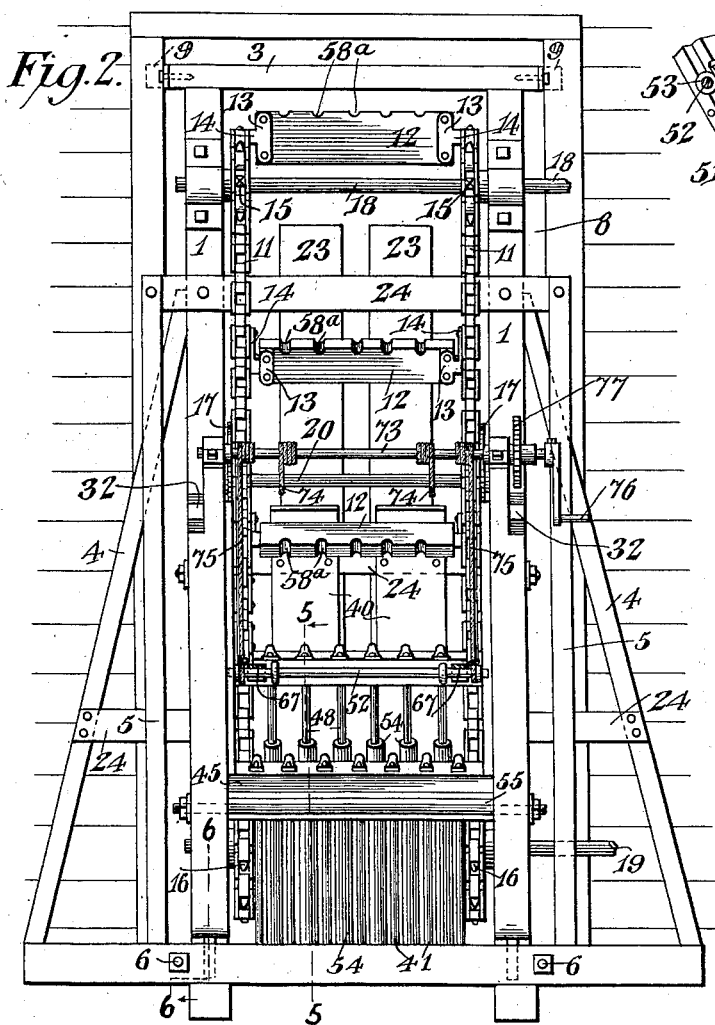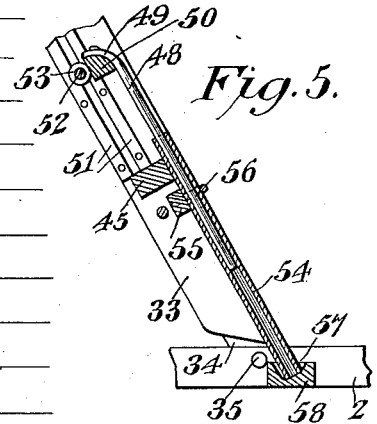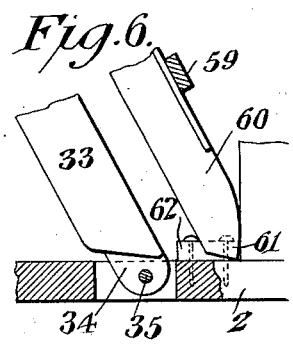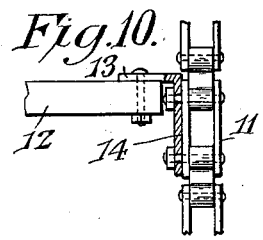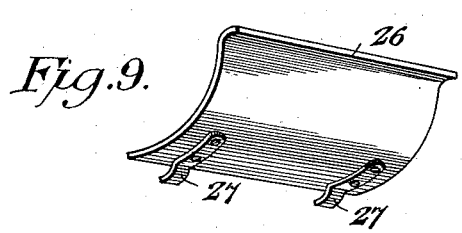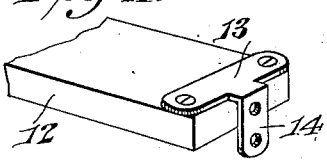

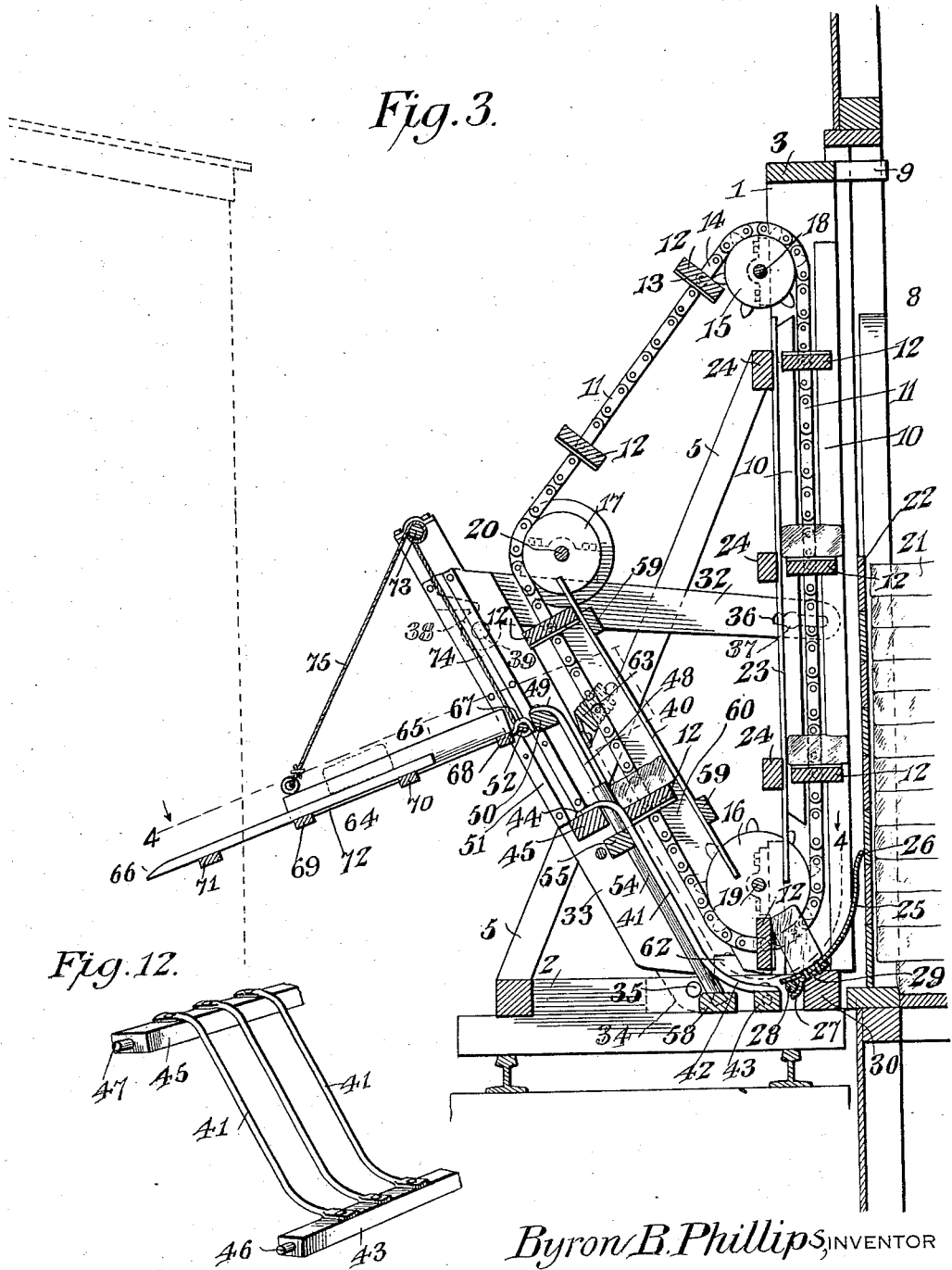

BYRON B. PHILLIPS, OF GOULDSBORO, PENNSYLVANIA.

CONVEYER FOR HANDLING ICE, &c.

1,072,985.  Specification of Letters Patent.  Patented Sept. 9, 1913.

Application filed October 30, 1912.  Serial No. 728,613.

*To all whom it may concern:*

Be it known that I, BYRON B. PHILLIPS, a citizen of the United States, residing at Gouldsboro, in the county of Wayne and State of Pennsylvania, have invented a new and useful Conveyer for Handling Ice, &c., of which the following is a specification.

The invention relates to improvements in conveyers for handling ice, etc.

The object of the present invention is to improve the construction of conveyers, and to provide a simple, efficient and comparatively inexpensive conveyer, designed for handling ice, freight and various kinds of merchandise, and adapted to be employed for either elevating or lowering the same, and capable of being operated through gravity when the loading point is at a higher elevation than the point of discharge.

A further object of the invention is to provide a conveyer of this character, designed particularly for handling material stored in tiers, and to provide means for adjusting the discharge chute to vary its length to extend it into a car or other vehicle or receptacle to be loaded or supplied with material handled by the conveyer and to control the point of discharge to suit the level of the material within the vehicle or receptacle.

The invention also has for its object to provide a portable conveyer adapted to be transferred from one door or portion to another to arrange it at the different doors of an ice house, warehouse, or the like.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a side elevation of a conveyer, constructed in accordance with this invention, and shown applied to a portion of an ice house or storage chamber, the latter being in section. Fig. 2 is a front elevation of the same. Fig. 3 is a central vertical sectional view, taken longitudinally of the conveyer. Fig. 4 is a sectional view on the line 4—4 of Fig. 3. Fig. 5 is a vertical sectional view on the line 5—5 of Fig. 2. Fig. 6 is a detail sectional view on the line 6—6 of Fig. 2. Fig. 7 is a transverse sectional view of the extensible chute on the line 7—7 of Fig. 4. Fig. 8 is a detail sectional view on the line 8—8 of Fig. 1. Fig. 9 is a detail perspective view of the guiding apron. Fig. 10 is a detail sectional view of a portion of the endless carrier. Fig. 11 is a detail perspective view of one end of one of the carrier bars. Fig. 12 is a detail perspective view of the lower section of the outer inclined guard.

Like numerals of reference designate corresponding parts in all the figures of the drawings.

In the accompanying drawings in which is illustrated the preferred embodiment of the invention, the conveyer is provided with a main supporting frame comprising spaced uprights 1 mounted on the inner portion of a frame base 2 and connected at their upper ends by a top cross bar 3 and supported by inclined braces 4 and 5. The base 2 of the frame is provided at opposite sides with tie rods 6 for holding the parts together. The main or supporting frame, which may be of any other preferred construction, is designed to be mounted upon a track 7 to enable it to be readily shifted from one point to another to enable it to be arranged at the different doors or openings of an ice house or other repository of the material to be handled. When operating in connection with an ice house 8, or other place for the storage of ice, the main frame is positioned at the doorway, and it is equipped at the top with horizontally projecting hooks 9, which have resilient portions for engaging the ice house at opposite sides of the door opening. The hooks are adapted to be sprung into and out of engagement with the beams or timbers at opposite sides of the doorway, but any other suitable means, however, may be employed for retaining the conveyer in position at the place of operation.

The uprights 1 are provided at their inner faces with vertical guides 10 formed by spaced strips or bars, or other suitable means and receiving inner vertical flights of sprocket chains 11 of an endless carrier, provided at intervals with transversely disposed carrier bars or members 12, which are secured to links of the sprocket chains. The carrier bars or members, which are designed to be of sufficient width to support the material to be handled, are constructed of wood, or any other suitable material and are provided at their ends with attaching plates 13, secured to the carrier bars at one of the faces thereof and provided with approximately L-shaped arms 14, which have outer attaching portions bolted or otherwise secured to the adjacent links of the sprocket chains. The carrier bars or members are adapted for handling ice, bales, packages, or the like, but carrier members or buckets of any suitable construction may, of course, be employed to adapt the conveyer to the character of material to be handled.

The sprocket chains are arranged on upper and lower sprocket wheels 15 and 16 and are guided by intermediate flanged wheels 17. The upper and lower sprocket wheels 15 and 16 are mounted on transverse shafts 18 and 19, and are located approximately in the same vertical planes, and the inner flight of the sprocket chains extending between the upper and lower sprocket wheels are vertical. The flanged wheels 17, which are mounted on the transverse shaft 20, are located beyond the vertical plane of the upper and lower sprocket wheels and at a point intermediate of the top and bottom of the conveyer, and they divide the outer portions of the sprocket chains into upper and lower inclined flights. The lower inclined flights extend upwardly and outwardly from the lower sprocket wheels to the intermediate guide wheels 17, and the carrier bars or members are set at an inclination and extend downwardly and outwardly to discharge their contents automatically when the load is free to leave the endless carrier. The upper inclined flights of the sprocket chains extend upwardly and inwardly from the wheels 17 to the upper sprocket wheels, and while I have shown and described sprocket chains, any other form of endless belt may, of course, be employed in the construction of the endless carrier.

The upper and lower transverse shafts 18 and 19 are journaled in suitable bearings of the main frame, and the endless carrier is adapted to be loaded at any point between the upper and lower sprocket wheels. In loading ice, the blocks or cakes 21 are placed on the carrier bars of the inner vertical flight of the endless carrier, the weight of the blocks or pieces moving the inner vertical flight downwardly and the blocks or pieces being retained on the carrier bars by the door boards 22, and a fixed inner vertical guard 23. The inner vertical guard 23 consists of vertical strips or pieces of metal, or other suitable material secured to transverse bars 24, extending across the space between the uprights 1 and secured to the same. The top transverse bar 24 is extended laterally and the upper ends of the inclined braces 5 are secured to the terminal portions of the same. The bottom transverse bar 24 is also extended laterally and is secured at its terminals to the inclined braces 4.

As the carrier bars travel around the lower portions of the bottom sprocket wheels 16, they deposit the cakes of ice in a basket formed by a curved guiding apron 25 and the lower portion of an outer inclined guard. The apron 25, which is constructed of stout sheet steel or other suitable material, presents a concave face to the ice, and it is curved rearwardly at its upper edge 26 to extend it to the adjacent door board and to prevent the cakes of ice from catching on the upper edge of the apron. The apron 25 is provided at the bottom with downwardly projecting hooks 27 secured to the rear face of the apron and having their bills or projecting portions spaced from the rear face of the apron and detachably engaging a transverse rod 28, extending across the base of the main frame and forming a support for the guiding apron. The lower portion of the guiding apron is arranged upon the transverse rod 28, and the hooks 27 extend beneath the rod 28, as clearly illustrated in Fig. 3 of the drawings. The base of the frame is provided with a seat 29 formed by beveling the upper portion of the inner or rear transverse beam 30 of the base of the frame and receiving the lower portion of the guiding apron and coacting with the transverse rod 28 in supporting the same.

The shaft 20, which supports the flanged guiding wheels, is mounted in suitable bearings 31 on adjustable arms 32 extending forwardly or outwardly from the uprights 1 and pivotally connected at their outer ends to the upper portions of side bars 33 of an inclined adjustable frame in which the outer inclined guard is mounted. The outer inclined adjustable frame extends upwardly and outwardly from the base of the main or supporting frame, and the lower ends 34 of the sides 33 are reduced and are pivoted by bolts 35 in recesses of the base of the main or supporting frame. The arms 32 are adjustable inwardly and outwardly and are provided at their inner or rear ends with longitudinal slots 36 and are secured in their adjustment by bolts 37. The arms 32 are adjusted to arrange the outer inclined frame at the proper inclination and to place the endless sprocket chains under the desired tension. The outer portions of the arms 32 are provided at the bottom with depending rounded ears 38 through which pass the pivot bolts 39, which connect the arms 32 to the sides 33 of the outer inclined frame.

When a cake of ice is deposited at the bottom of the conveyer by one of the carrier bars, it is engaged by the next succeeding carrier bar and moved upwardly and outwardly between a yieldably mounted guard 40 and the outer extensible guard. The outer inclined guard is composed of a lower relatively fixed section and an upper extensible section. The lower relatively fixed section consists of a series of inclined rods 41 arranged in spaced relation and having their lower portions 42 curved rearwardly and terminating in advance of the lower edge of the guiding apron and secured by screws or other suitable fastening devices to a transverse bar 43. The upper ends 44 of the rods 41 are curved outwardly and are secured to the upper face of a transverse bar 45. The lower bar 43 and the upper bar 45 are provided at their ends with reduced rounded portions forming journals 46 and 47, arranged in suitable bearing openings in the base 2 of the main frame and in the side bars or pieces 33. By this construction, the lower relatively fixed section of the outer inclined guard does not interfere with the adjustment of the inclined frame. The upper extensible section of the outer guard consists of a series of inclined rods 48 having outwardly curved upper ends 49, which are secured by screws or other suitable fastening devices to a transverse bar 50, extending across the space between the sides of the inclined frame and slidably connected with inclined guides 51 thereof by means of a transverse rod 52, mounted on eyes 53 of the bars 50 and having its terminals extended into the inclined guides or ways 51. The inclined guides or ways may be formed by strips or pieces secured to the inner faces of the sides 33 of the inclined frame, or they may be constructed in any other manner. The inclined rods 48 are guided by and telescope into lower tubular rods or members 54, secured at their upper portions to a transverse bar 55 of the inclined frame by fastening devices 56, which embrace the tubular rods or members 54. The tubular rods or members prevent the extensible rods from becoming clogged by chips of ice, and they have their lower ends stepped in suitable sockets 57 of a transverse rod 58 of the base 2 of the main supporting frame, and their upper ends rest against the transverse bar 45 to which the upper ends of the rods 41 are secured. The tubular rods or members are adapted to oscillate in the sockets 57 of the bar 58 of the base of the main frame to conform to the movements of the inclined frame in the adjustment of the latter. As the extensible upper section of the outer guard is raised or lowered, its inclined rods slide in the tubular rods or members 54. The rods of the lower guard section are arranged in the same transverse plane, and the carrier bars or members are provided in their outer edges with curved notches 58ᵃ to receive the rods and permit the carrier bars or members to slide along the same in close proximity thereto, so that the ice or other contents of the endless carrier will be retained on the carrier bars or members.

The yieldable guard, which is arranged at an inclination, consists of flat strips or pieces secured to transverse connecting bars 59, which extend across the space between and have their terminals fastened to inclined side bars or members 60, having tapered lower ends 61 supported upon the base 2 of the main frame in advance of the uprights 1 and held against lateral movement by side blocks 62. The tapered lower ends of the side bars or members 60 permit the yieldable inclined guard to have a pivotal backward and forward movement. The forward or outward movement of the yieldable guard is limited by the side bars of the inclined frame against which the upper portions of the bars or members 60 normally rest. The side bars or members 60 of the inclined oscillatory guard are connected with the sides 33 of the inclined frame by coiled springs 63, which yieldably maintain the guard 40 in position for retaining the cakes of ice on the carrier bars, while the latter are traveling upwardly along the lower inclined flight of the endless carrier. The coiled springs permit the guard 40 to yield and swing inwardly or rearwardly in case a block or cake gets crosswise or is of irregular form or size, and the yieldable mounting of the guard 40 also allows the ice to crowd or collect on an extensible inclined chute 64 and facilitates a free release or dumping of the ice onto the said chute.

The extensible inclined chute, which is adapted to receive the ice from the endless carrier, is composed of inner and outer sections 65 and 66, and is connected with the extensible upper section of the outer guard by hooks 67, which engage over the rod 52. The inner section 65 is composed of spaced longitudinal bars and inner and outer transverse connecting bars 68 and 69. The outer section 66 is also composed of spaced longitudinal bars and inner and outer transverse connecting bars 70 and 71. The bars of the outer section slide in the spaces between the bars of the inner section, which is provided at the sides with inwardly extending flanges formed by metallic strips 72, secured to the lower edges of the side bars of the inner section 65 and projecting from the inner faces of the said side bars. The bars of the outer section rest upon the outer transverse bar 69 of the inner section, and the inner transverse bar 70 of the outer section fits against the lower face of the longitudinal bars of the inner section. By this construction, the sections 65 and 66 are slidably connected and the inclined chute is adapted to be varied in length to extend its outer portion into a car or other vehicle or receptacle to be loaded or supplied with the material handled by the conveyer. The hooks, which detachably support the inclined chute upon the extensible section of the outer guard, are formed integral with the metallic strips 72.

The extensible section of the outer guard is adjusted by means of a windlass consisting of a transverse shaft 73 and ropes or cables 74 and 75, connected, respectively, with the transverse rod 52 and with the sides of the inner section of the extensible chute. The windlass shaft is equipped at one end with a crank handle 76 and it has a ratchet wheel 77, keyed or otherwise secured to it and engaged by a pawl 78. The windlass shaft is adapted to be rotated to raise and lower the extensible upper section of the outer guard and to take up the slack of the ropes or cables, which extend to the inclined chute, and the latter after being adjusted to the proper angle independently of the rotary movement of the windlass shaft is maintained in such relative position when the extensible section of the outer guard is raised and lowered.

The adjustment of the chute and the extensible section of the outer guard controls the point of discharge to suit the level of a car or other receptacle to be loaded. In loading a car with ice, one tier or layer is run in upon the bottom of the car, then the chute is raised to run the next layer on the top of the bottom layer and so on until the car is filled. The raising of the chute and the extensible section of the outer inclined guard maintains the chute at a proper elevation for each layer giving all the ice a uniform speed in discharging the same into the car. When the point of loading becomes too low for the ice or other material to actuate the conveyer, any suitable power may be employed and the same may be connected with the lower transverse shaft 19 by any suitable gearing, the lower transverse shaft being extended from one side of the frame for this purpose. The extended portion of the shaft 19 carries a pulley 80 around which passes a driving belt 81. The upper transverse shaft 18 is also extended beyond one side of the frame and the machine is designed to be equipped with a suitable brake for controlling the endless conveyer. In Fig. 1 of the drawings, a band brake is shown consisting of a brake wheel 82, mounted on the extended portion of the upper transverse shaft 18 and engaged by a brake band 83, secured at one end and connected at the other end with an operating lever 84 by means of which the brake is applied. Any other suitable form of brake may, of course, be employed. When the contents of an ice house or other place of storage are below the upper edge of the guiding apron, the latter is adapted to be removed and a short run of any suitable construction may be substituted for the same for guiding the material to the bottom of the conveyer, so that it will be carried up the inclined flight or portion of the endless carrier.

What is claimed is:—

1. A conveyer of the class described including a supporting frame, an endless carrier having an inner downwardly moving vertical loading flight adapted to receive a load at any elevation throughout any length of the flight, and an outer upwardly moving inclined discharging flight adapted to elevate the load, and a chute arranged in advance of the discharging flight in position to receive the contents thereof, said endless carrier being operable by gravity when the loading point is above the point of discharge.

2. A conveyer of the class described including a main frame, an endless carrier having a downwardly moving vertical loading flight adapted to receive the material at different elevations, and an upwardly moving outer inclined flight for elevating the material, said endless carrier being provided with carrier bars or members arranged in a horizontal position while moving downward in the vertical flight and set at an inclination during their travel up the inclined flight and adapted to discharge their contents automatically, and means for retaining the material on the carrier bars or members of the inclined flight until it reaches a predetermined elevation.

3. A conveyer of the class described including a main frame, an endless carrier having a downwardly moving vertical loading flight adapted to receive the material at different elevations, and an upwardly moving outer inclined flight for elevating the material, said endless carrier being provided with carrier bars or members arranged in a horizontal position while moving downward in the vertical flight and set at an inclination during their travel up the inclined flight and adapted to discharge their contents automatically, means for retaining the material on the carrier bars or members of the inclined flight until it reaches a predetermined elevation, and an inclined chute arranged to receive the material as the same is discharged from the endless carrier.

4. A conveyer of the class described including a main frame, an endless carrier having a downwardly moving vertical loading flight adapted to receive the material at different elevations, and an upwardly moving outer inclined flight for elevating the material, said endless carrier being provided with carrier bars or members arranged in a horizontal position while moving downward in the vertical flight and set at an inclination during their travel up the inclined flight and adapted to discharge their contents automatically, extensible means for maintaining the material on the carrier bars or members of the inclined flight, and a chute connected with and carried by the said extensible means and arranged to receive the material discharged by the endless carrier.

5. A conveyer of the class described including a frame, an endless carrier comprising an inner downwardly moving loading flight, and an outer upwardly moving inclined elevating and discharging flight, a basket arranged at the bottom of the endless carrier in position to receive the material from the downwardly moving flight and adapted to hold the material in position for causing the same to be carried upwardly by the inclined elevating and discharging flight, and a chute arranged to receive the material as it is discharged from the outer inclined flight.

6. A conveyer of the class described including a main frame, an endless carrier comprising a downwardly moving loading flight, and an upwardly moving outer elevating flight, means located at the bottom of the conveyer and arranged to receive the material from the downwardly moving flight for holding the material in position to be carried upwardly by the outer flight, and a chute arranged to receive the material as it is discharged from the endless carrier.

7. A conveyer of the class described including a main frame, an endless carrier comprising an inner downwardly moving loading flight, and an outer upwardly moving elevating flight, a guiding shield arranged in spaced relation with the bottom of the endless carrier and adapted to receive the material from the loading flight, and an inclined guard arranged at the outer side of the inclined flight and extending upwardly from the guiding shield for retaining the material on the inclined flight until it reaches the point of discharge.

8. A conveyer of the class described including a main frame, an endless carrier comprising an inner downwardly moving loading flight, and an outer upwardly moving elevating flight, a curved guiding shield arranged in spaced relation with the bottom portion of the endless carrier and provided with hooks detachably engaging the main frame and adapted to permit the removal of the shield, and an outer inclined guard extending upwardly from a point in advance of the shield for retaining the material on the inclined flight of the endless carrier until it reaches the point of discharge.

9. A conveyer of the class described including a main frame, an endless carrier having an inner downwardly moving loading flight, and an outer upwardly moving inclined elevating flight, an inclined outer guard arranged to retain the material on the inclined flight and composed of a lower relatively fixed section and an upper extensible section adapted to be raised and lowered to vary the point of discharge.

10. A conveyer of the class described including a main frame, an endless carrier having an inner downwardly moving loading flight, and an outer upwardly moving inclined elevating flight, an inclined outer guard composed of a lower section provided with spaced inclined rods, and an extensible upper section also provided with spaced inclined rods guided between the rods of the lower section.

11. A conveyer of the class described including a main frame, an endless carrier having an inner downwardly moving loading flight, and an outer upwardly moving inclined elevating flight, an inclined outer guard composed of a lower relatively fixed section, an upper extensible section provided with spaced inclined rods, and inclined tubular rods mounted on the lower section and receiving and guiding the rods of the upper section.

12. A conveyer of the class described including a main frame, an endless carrier having an inner downwardly moving loading flight, and an outer upwardly moving inclined elevating flight, an outer inclined guard provided with an extensible section, an inclined chute detachably connected to and carried by the extensible section, and means connected with the extensible section and with the chute for raising and lowering the same.

13. A conveyer of the class described comprising a main frame, an endless carrier including an inner downwardly moving loading flight, and an outer upwardly moving inclined elevating flight, an outer inclined guard arranged at the outer side of the said inclined flight, and an inner inclined yieldably mounted guard arranged at the inner side of the said inclined flight.

14. A conveyer of the class described comprising a main frame, an endless carrier including an inner downwardly moving loading flight, and an outer upwardly moving inclined elevating flight, an outer inclined guard arranged at the outer side of the said inclined flight, and an inner inclined guard arranged at the inner side of the inclined flight, and springs for yieldably holding the inner inclined guard in position.

15. A conveyer of the class described comprising a main frame, an endless carrier including an inner downwardly moving loading flight, and an outer upwardly moving inclined elevating flight, an outer inclined guard arranged at the outer side of the said inclined flight, and an inner oscillatory inclined guard arranged at the inner side of the inclined flight and arranged to swing backwardly and forwardly, and springs connected with the inner inclined guard for urging the same outwardly.

16. A conveyer of the class described comprising a main frame, an endless carrier including a downwardly moving inclined loading flight, and an outer upwardly moving inclined elevating and discharging flight, a hinged inclined frame having guiding wheels receiving the endless carrier at the top of said inclined flight, an outer inclined guard mounted on and carried by the inclined frame and arranged to retain the material on the inclined flight, and means for adjustably connecting the inclined frame with the main frame.

17. A conveyer of the class described comprising a main frame, an endless carrier including a downwardly moving inclined loading flight, and an outer upwardly moving inclined elevating and discharging flight, a hinged frame mounted on the main frame and provided with guides, an outer guard arranged to retain the material on the said inclined flight and having an extensible section slidable on the guides of the hinged frame, and means for adjustably connecting the hinged frame with the main frame.

18. A conveyer of the class described comprising a main frame, an endless carrier including a downwardly moving inclined loading flight, and an outer upwardly moving inclined elevating and discharging flight, a hinged frame mounted on the main frame and provided with guides, an outer guard arranged to retain the material on the said inclined flight and having an extensible section slidable on the guides of the hinged frame, and arms pivotally connected to the hinged frame and adjustably secured to the main frame.

19. A conveyer of the class described comprising a main frame, an endless carrier including an inner downwardly moving loading flight, and an outer upwardly moving inclined elevating flight, a hinged frame mounted on the main frame and adjustably connected with the same, and a lower inclined guard section arranged at the outer side of the said inclined flight and composed of spaced inclined rods, and upper and lower transverse connecting rods having terminal pivots arranged in bearings of the main and hinged frames.

20. A conveyer of the class described comprising a main frame, an endless carrier including a downwardly moving inner vertical loading flight, an inclined upwardly moving outer elevating flight, said endless carrier being provided with carrier bars or members having recesses in their outer edges, and an outer guard provided with inclined rods arranged at the outer side of the inclined flight and adapted to fit in the recesses of the said carrier bars or members.

21. A conveyer of the class described including a main frame, an inclined frame hinged to the main frame, arms adjustably connecting the hinged frame with the main frame, upper and lower sprocket wheels mounted on the main frame, intermediate guide wheels carried by the said arms, endless sprocket chains arranged on the said wheels, carrier bars or members connecting the sprocket chains, and an outer guard carried by the hinged frame, the latter being adjustable to vary the pitch of the endless carrier and to regulate the tension thereof.

In testimony, that I claim the foregoing as my own, I have hereto affixed my signature in the presence of two witnesses.

BYRON B. PHILLIPS.

Witnesses:
E. F. SEBRING,
M. H. EILENBERGER.

---

Copies of this patent may be obtained for five cents each, by addressing the "Commissioner of Patents, Washington, D. C."